Feb. 24, 1942.                W. E. INGERSON                2,274,413
          METHOD OF AND APPARATUS FOR MAKING SOLDER CONNECTIONS
                        Filed Jan. 4, 1941

INVENTOR
W. E. INGERSON
BY
J. MacDonald
ATTORNEY

Patented Feb. 24, 1942

2,274,413

UNITED STATES PATENT OFFICE 2,274,413

METHOD OF AND APPARATUS FOR MAKING SOLDER CONNECTIONS

William E. Ingerson, New York, N. Y., assignor to Bell Telephone Laboratories, Incorporated, New York, N. Y., a corporation of New York Application January 4, 1941, Serial No. 373,104

4 Claims. (Cl. 113—112)

This invention relates to a method of and apparatus for solder connecting lead wires to electrical units.

For the purpose of explanation and not in the sense of limiting the invention to such use, the invention is described as being used in solder connecting a lead wire to a metal coated thermistor unit.

Figure 1:
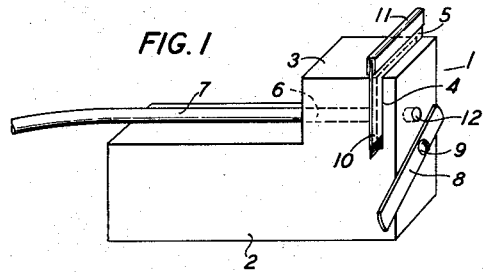
Fig. 1 is a view in perspective of a cutter device for cutting a wire of solder, the wire being shown inserted in the cutter and the cutter having been operated to cut off a piece of the wire.

The cutter 1 shown in Fig. 1 comprises a block 2 having an upwardly extending end portion 3, the end portion 3 being deeply slotted at 4 to receive a knife 5 and apertured at 6 to receive a wire of solder 7, the aperture extending entirely through the end portion 3 and being intersected by the slot 4. A stop bar 8 is pivotally supported by a screw 9 on the block 2 and is arranged for movement in line with one end of the aperture 6 to limit thrusting of the wire 7 through the block 2. The knife 5 comprises a blade portion 10 having a reenforcing bar 11 on its upper portion. The blade portion 10 is disposed within the slot 4 and may be moved to sever the wire 7. The bar 11 serves to stiffen the blade portion 10 and is made thicker than the width of the slot 4 and is so arranged that it will act as a stop to prevent driving of the lower sharpened edge of the blade portion 10 against the bottom of the slot 4. Predetermined length pieces of solder wire may be cut from the wire 7 by thrusting the wire 7 through the aperture 6 and into engagement with the stop bar 9 and then by forcing the knife 5 downwardly within the slot 4. Movement of the knife 5 may be accomplished by applying a downward pressure against the bar 11. The piece of solder severed from the wire 7 comes out of the cutter 1 in the form of a solder pellet 12 and is later used in forming a button of solder on the end of the lead wire.

Figure 2:
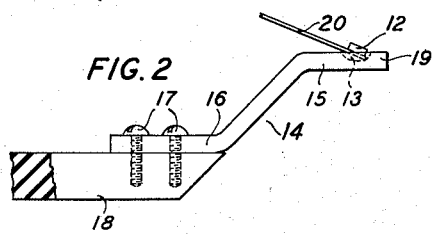
Fig. 2 is a side elevational view partly in section of a mold with the lead wire and a piece of the solder wire inserted in a cavity in the mold.
Figure 3:
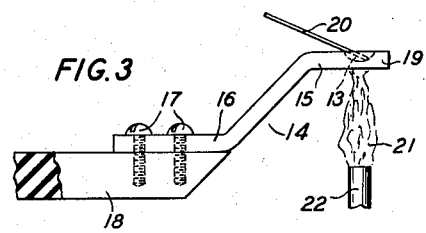
Fig. 3 is a view corresponding to Fig. 2, but with a flame applied to the mold and with the solder in a molten condition about an end of the lead wire.

The pellet 12 as shown in Fig. 2 is placed in a cavity 13 in the mold 14. The mold 14 comprises a plate 15 made of material to which solder will not adhere and through which heat may be transmitted to the pellet 12. A suitable material for the plate 15 is aluminum. One end 16 of the plate 15 is secured by means of the screws 17 to a suitable support 18. The free end 19 is offset from the plane of the end 16 and is provided with the cavity 13 which is of sufficient area to receive an end portion of the lead wire 20 and all of the material in the pellet 12. The pellet 12 is placed in the cavity 13 and an end of the lead wire 20 is also thrust into the cavity. Heat is then applied to the plate 15 to melt the pellet 12. The heat may be applied as shown in Fig. 3 by means of the flame 21 from a burner 22. The pellet 12 is melted down into the cavity 13 and upon removal of the flame 21, solidifies on the end of the lead wire 20 in the form of the cavity 13 which is of such contour that it will mold the material in the pellet 12 into the form of a button 23.

Figure 4:
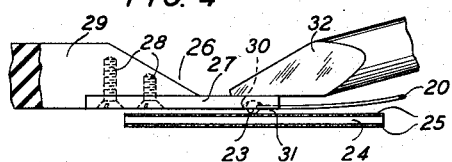
Fig. 4 is a side elevational view of a thermistor unit with the lead wire equipped with a button of solder resting on the electrode surface of the unit, a second mold resting on the button of solder and a heated tool resting on the mold.

The wire 20 with the button 23 of solder formed thereon is placed as shown in Fig. 4 on the thermistor unit 24 and so that the rounded portion of the button 23 is in contact with an electrode 25 provided on the thermistor unit 24. The electrode 25 may be a suitable coating of metal formed on the thermistor 24. A second mold 26 is then employed to transmit heat to the parts and make a solder connection between the wire 20 and the electrode 25.

Figure 5:
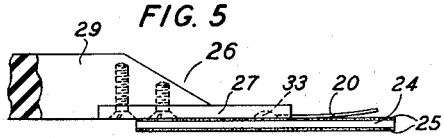
Fig. 5 shows the position of the members shown in Fig. 4 minus the heating tool and after sufficient heat has been applied to melt the button of solder; and, Figs. 6 and 7 show, respectively, a top and a side view of the thermistor unit with the lead wires solder connected thereto.
Figure 6:
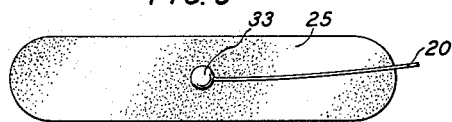
Figure 7:
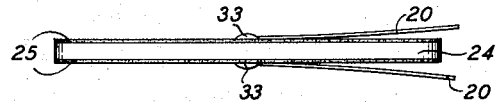

The mold 26 comprises a plate 27 of heat transmitting material which has no affinity for solder. A suitable material for the plate 27 is aluminum. The plate 27 is secured at one end by means of the screws 28 to a movable support 29. A cavity 30 is provided in the lower surface of the plate 27 to receive the material in the button 23 when the button 23 has been heated to the melting point of the solder material. The cavity 30 is of general hemispherical form and has a channel 31 extending therefrom to the outer end of the plate 27 to accommodate a portion of the lead wire 20. Heating of the button 23 is accomplished by placing a heated tool 32 on the plate 27. The tool 32 may be a conventional type of soldering iron. Heat from the tool 32 is transmitted to the button 23 through the plate 27. When the button 23 becomes molten, the weight of the tool 32 plus the weight of the plate 27 causes the plate 27 to move downwardly until the plate 27 comes to rest on the electrode 25, Fig. 5. The material in the button 23 is pressed upward into the cavity 30 and, upon removal of the tool 32 and cooling of the material makes a solder connection 33 between the wire 20 and the electrode 25. The solder connection 33 is shown in Figs. 5 and 6. In Fig. 7 two lead wires 20 are shown connected to the electrodes 25 of the thermistor unit 24.

What is claimed is:

1. A method of solder connecting a lead wire to a unit having a surface to which solder will adhere, comprising forming on an end of said wire a solder button having a rounded portion, placing said rounded portion against said surface, resting on said button a mold made of material having no affinity for solder and having an indentation therein adapted to receive the amount of material in said button, resting a heated tool on said mold until the solder is melted sufficiently to adhere to said surface and take the form of the indentation in said mold and removing the heated tool from said mold.

2. A method of solder connecting a lead wire to a surface to which solder will adhere, comprising making a pellet of solder, placing said pellet and an end of said wire in a mold of material to which solder will not adhere, heating said mold to melt said pellet and cooling said mold to form a button of solder on the end of said wire, placing said button on said surface, resting a second mold of material to which solder will not adhere, on said button, heating said second mold to melt said button, pressing said second mold down on said button while the material in said button is in a molten condition and allowing said second mold and the solder contained therein to cool and form a solder connection between said wire and said surface.

3. A method of solder connecting a lead wire to a surface to which solder will adhere, comprising cutting a piece of solder into pellet form, placing said pellet and an end of said wire in a cavity in an aluminum plate, heating said plate to melt said pellet, allowing said plate and the solder held in the cavity thereof to cool to form a button of solder on the end of said wire, placing said button on said surface, placing a mold plate of aluminum on said button, and so that a cavity in said mold plate is in register with said button, resting a heated tool on said mold plate until said button is in a molten condition, and the material in said button has flowed up into said cavity, and then allowing said mold plate and the solder in the cavity therein to cool to form a solder connection between said wire and said surface.

4. An apparatus for making a solder connection between a unit having a surface to which solder will adhere and a lead wire comprising in combination, a plate made of material having no affinity for solder, an indentation formed in the upper surface of said plate to cast a drop of solder in button-like form on an end of said wire, means to heat said plate, a second plate having no affinity for solder, an indentation in the lower surface of said second plate adapted to receive said wire and the amount of solder cast on said wire and a heated tool bearing downwardly on said second plate to heat said second plate to the melting temperature of said solder, and press said solder against said unit and upwardly into the indentation in said second plate.

WILLIAM E. INGERSON.